(12) United States Patent
Hahn

(10) Patent No.: US 12,115,664 B2
(45) Date of Patent: Oct. 15, 2024

(54) METHOD FOR USING A ROBOT SYSTEM AND ROBOT SYSTEM FOR A CONTAINER PROCESSING FACILITY

(71) Applicant: KRONES AG, Neutraubling (DE)

(72) Inventor: Wolfgang Hahn, Neutraubling (DE)

(73) Assignee: KRONES AG, Neutraubling (DE)

( * ) Notice: Subject to any disclaimer, the term of this patent is extended or adjusted under 35 U.S.C. 154(b) by 526 days.

(21) Appl. No.: 17/283,237

(22) PCT Filed: Jul. 12, 2019

(86) PCT No.: PCT/EP2019/068849
§ 371 (c)(1),
(2) Date: Apr. 6, 2021

(87) PCT Pub. No.: WO2020/074145
PCT Pub. Date: Apr. 16, 2020

(65) Prior Publication Data
US 2021/0339383 A1    Nov. 4, 2021

(30) Foreign Application Priority Data

Oct. 12, 2018 (DE) ............ 10 2018 217 470.9

(51) Int. Cl.
*B25J 5/00* (2006.01)
*B25J 9/08* (2006.01)
*B25J 9/16* (2006.01)
*B25J 11/00* (2006.01)

(52) U.S. Cl.
CPC ........... *B25J 9/08* (2013.01); *B25J 5/007* (2013.01); *B25J 9/1679* (2013.01); *B25J 11/0085* (2013.01)

(58) Field of Classification Search
CPC ... B25J 9/1679; B25J 5/00; B25J 5/007; B25J 9/08; B25J 11/0085
See application file for complete search history.

(56) References Cited

U.S. PATENT DOCUMENTS

| | | | |
|---|---|---|---|
| 5,959,423 A | 9/1999 | Nakanishi et al. | |
| 9,149,927 B2* | 10/2015 | Sturm | B25J 5/007 |
| 2015/0241872 A1* | 8/2015 | Huang | B08B 3/022 |
| | | | 901/30 |

(Continued)

FOREIGN PATENT DOCUMENTS

| | | |
|---|---|---|
| DE | 102010026798 A1 | 1/2012 |
| EP | 2918391 A1 | 9/2015 |
| WO | 2009146899 A1 | 12/2010 |

OTHER PUBLICATIONS

ISA European Patent Office, International Search Report Issued in Application No. PCT/EP2019/068849, Oct. 16, 2019, WIPO, 5 pages.

*Primary Examiner* — Gabriel Agared
(74) *Attorney, Agent, or Firm* — McCoy Russell LLP

(57) ABSTRACT

Method for using a robot system carrying out a job at a workstation of a container processing facility, wherein the robot system moves with a chassis supported on the floor in a working area of the container processing facility, characterized in that the robot system automatically removes work material and/or consumable material needed for the job, such as, for example, a cleaning agent or a lubricant, at a supply area and transports it to the workstation for the job.

9 Claims, 1 Drawing Sheet

(56) References Cited

U.S. PATENT DOCUMENTS

2015/0251366 A1* 9/2015 Voth ................. B29C 31/006
                                                    425/88
2018/0118476 A1* 5/2018 Bastian, II .......... B65G 41/001

* cited by examiner

METHOD FOR USING A ROBOT SYSTEM AND ROBOT SYSTEM FOR A CONTAINER PROCESSING FACILITY

CROSS REFERENCE TO RELATED APPLICATIONS

The present application is a U.S. National Phase of International Application No. PCT/EP2019/068849 entitled "METHOD FOR USING A ROBOT SYSTEM, AND ROBOT SYSTEM FOR A CONTAINER PROCESSING FACILITY," and filed on Jul. 12, 2019. International Application No. PCT/EP2019/068849 claims priority to German Patent Application No. 10 2018 217 470.9 filed on Oct. 12, 2018. The entire contents of each of the above-listed applications are hereby incorporated by reference for all purposes.

TECHNICAL FIELD

The invention relates to a method for using a robot system and a robot system for a container processing facility having the features of the preamble of claim 1 or 8, respectively.

BACKGROUND AND SUMMARY

Robot systems are typically employed in container processing facilities to carry out jobs of many different kinds, for example, maintenance and/or servicing works at container handling machines. For example, a job can consist in cleaning the conveyor belt of a container handling machine with a cleaning agent or providing it with a lubricant. To this end, the robot system comprises a chassis supported on the floor to move in a working area of the container processing facility.

In WO 2009/146899 A1, a multidirectionally movable vehicle comprising a mobile vehicle and a robot arm arranged thereon is disclosed. For an independent mobility, wheels are arranged at the vehicle which are controlled by an on-board controlling system.

A disadvantage of such robot systems is that work materials and/or consumable materials needed for the job have to be manually refilled by an operator.

U.S. Pat. No. 5,959,423 discloses a system with a mobile working robot and a separate station designed to control the movement of the mobile working robot and to perform maintenance works thereon. During the maintenance works, for example, parts are replaced and consumable materials refilled which are needed for the movement and the work of the working robot.

It is a disadvantage that the setup of the separate station is cumbersome and floor space is required in the working area of the container processing facility.

It is therefore the object of the present invention to provide a method for using a robot system and a robot system for a container handling facility wherein the handling of the work material and/or consumable material needed for the job is facilitated.

To achieve this object, the invention provides a method for using a robot system having the features of claim 1. Advantageous embodiments of the invention are stated in the sub-claims.

By the robot system automatically removing work material and/or consumable material needed for the job, such as a cleaning agent or lubricant, for example, at a supply area and transporting it to the workstation for the job, the removal is accomplished automatically by the robot system itself and without needing an operator or a complex station. Consequently, the handling of the work material and/or consumable material needed for the job is facilitated.

The container processing facility can comprise a plurality of container handling machines, the containers being transported by one or more transporters from one of the container handling machines to a successive one. For example, one container handling machine can package a beverage into the containers. The container handling machines can comprise a container manufacturing machine, a rinser, an inspection device, a labelling machine, a filler for packaging a beverage into the containers, a packaging machine and/or a palletiser.

A fluid product, such as a beverage, a food item, a pharmaceutical product, a medical product, a cleaning agent, a spray, and/or a body care product, can be received in and/or packaged into the containers. Preferably, the container can mean a beverage container. A beverage can mean mineral water, a soft drink, a juice and/or beer. A food item can mean a product, such as the beverage, vinegar, edible oil and/or the like. Preferably, a container in which a liquid or pasty product is transported from the manufacturer to the consumer can be meant.

A fluid product can be packaged into each of the containers, and subsequently, a closure can be applied. The containers can be plastic bottles, glass bottles, cans and/or tubes. Plastic bottles can be specifically PET, PEN, HD-PE or PP bottles. They can equally be biodegradable containers whose main components consist of renewable resources, such as, for example, sugar cane, wheat or sweetcorn.

The chassis supported on the floor can be supported on a floor with a plurality of wheels. It is conceivable that at least one of the wheels is driven and/or steered while it is moving. An electric motor can drive the chassis supported on the floor for moving it. The chassis supported on the floor can be steered with a steering mechanism which in particular comprises at least one steerable wheel. For example, the electric motor and/or the steerable wheel can be controlled with a controlling unit of the robot system. In other words, the robot system can be embodied with a controlling unit to control the chassis supported on the floor and/or a robot unit. Preferably, the controlling unit can navigate the robot system in the container processing facility.

The robot system can be supplied with power by a rechargeable battery and/or an electric interface.

The robot system can move at least one robot arm with at least one joint and/or one travel unit when it is carrying out the job in particular in order to move a tool or a tool holding fixture. For example, the tool can be a nozzle that is moved with the robot system to apply a cleaning medium or a lubricant. It is conceivable for the tool holding fixture to receive tools of different types. Preferably, the robot arm or the travel unit, respectively, can move the tool three-dimensionally in the space. However, a two-dimensional or one-dimensional movement is also conceivable.

It is also conceivable that the robot system has a modular design and comprises a mobile platform with the chassis supported on the floor and with multiple robot units of different types for carrying out jobs of different kinds in the container handling facility. However, it is also conceivable that the robot system comprises a mobile platform with a robot unit permanently arranged thereon, wherein the robot unit in particular comprises the robot arm and/or the travel unit.

During the job, the work material and/or consumable material can be applied at a container handling machine of the container processing facility and/or transferred thereto. For example, a cleaning agent or lubricant can be applied at a transporter of the container handling machine. It is also conceivable that joints or hinges are provided with a lubricant, or a lubricant tank is filled. The work material and/or consumable material can also be a roll with a label tape for a labelling machine.

The robot system can transport the work material and/or consumable material to the workstation in at least one accessory trailer. Thereby, the capacity of the work material and/or consumable material is increased and can be configured more flexibly. For example, the robot system can be flexibly combined with various accessory trailers containing different work materials and/or consumable materials. It is conceivable that the at least one accessory trailer comprises a plurality of accessory trailers which are simultaneously combined with the robot system in parallel or in series.

The robot system can remove the work material and/or the consumable material by automatically coupling the at least one accessory trailer with the needed work material and/or consumable material in the supply area. Thereby, the robot system itself can control whether it carries along (an) accessory trailer(s) for the job, and which one. For example, the robot system can remove the at least one accessory trailer from a magazine with a plurality of accessory trailers which each contain the same or different work materials and/or consumable materials.

The robot system can remove the work material and/or consumable material needed for the job from the at least one accessory trailer at the workstation. Thereby, the work material and/or consumable material does not have to be directly removed from a supply of the robot system. For example, the robot system can remove the work material and/or consumable material with a robot arm or with hoses or the like provided for this purpose. It is also conceivable that a conveyor system is provided for conveying the work material and/or consumable material to the robot system.

The robot system can actuate a coupling by means of a robot arm and thereby automatically couple the at least one accessory trailer. Thereby, the coupling can be designed mechanically and thus does not require a separate actuator. It is conceivable that the robot system actuates couplings of a plurality of accessory trailers by means of the robot arm and thereby automatically couples a plurality of accessory trailers.

The robot system can identify the needed work material and/or consumable material and/or the at least one accessory trailer by means of digital identification elements, in particular by means of a barcode or an RFID chip. Thereby, the robot system can automatically identify materials of different kinds or different accessory trailers so that confusions can be excluded.

It is conceivable that for the job, the robot system is at least temporarily connected to a superordinated controlling centre via a data connection, in particular via a computer network. Thereby, a plurality of robot systems can be coordinated in the container handling facility. The computer network can be, for example, a wireless network, such as WLAN, a mobile communications system, or the like. This superordinated controlling centre can be, for example, a computer system where an operator stores an application plan for a plurality of such robot systems.

Moreover, to achieve the object, the invention provides a robot system for a container processing facility having the features of claim 8. Advantageous embodiments of the invention are stated in the sub-claims.

By the robot system being designed to automatically remove work material and/or consumable material needed for the job, such as a cleaning agent or lubricant, for example, at a supply area and to transport it to the workstation for the job, the removal is accomplished automatically by the robot system itself and without needing an operator or a complex station. Consequently, the handling of the work material and/or consumable material needed for the job is facilitated.

The robot system can analogously comprise the features described above with reference to the method for using a robot system, in particular according to one of claims 1 to 7, individually or in any combination.

In particular, the robot system can comprise at least one accessory trailer to transport the work material and/or consumable material to the workstation. Thereby, the capacity of the work material and/or consumable material is increased and can be configured more flexibly. The at least one accessory trailer can comprise one or more wheels each. The wheels can be arranged at the respective accessory trailer to be steerable actively or passively. It is conceivable that the at least one accessory trailer comprises a plurality of accessory compartments which are designed, for example, as drawers, shelves and/or box compartments.

The robot system can comprise a coupling to therewith selectively connect the at least one accessory trailer with the chassis supported on the floor or release it therefrom. Thereby, the at least one accessory trailer can be particularly flexibly connected to the chassis supported on the floor. It is conceivable that the at least one accessory trailer is connectable to the mobile platform via the coupling. It is also conceivable that a plurality of accessory trailers can be connected to each other or released from each other in series via such couplings.

BRIEF DESCRIPTION OF THE FIGURES

Further features and advantages of the invention will be illustrated below more in detail with reference to the exemplified embodiments represented in the figures. In the figures.

DETAILED DESCRIPTION

Figure 1A:
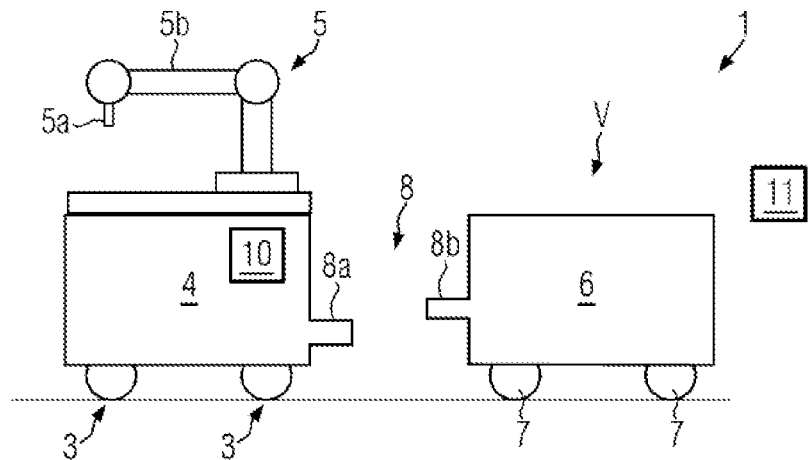
FIGS. 1A-1C show an exemplified embodiment of a method according to the invention for using a robot system in a side view.
Figure 1B:
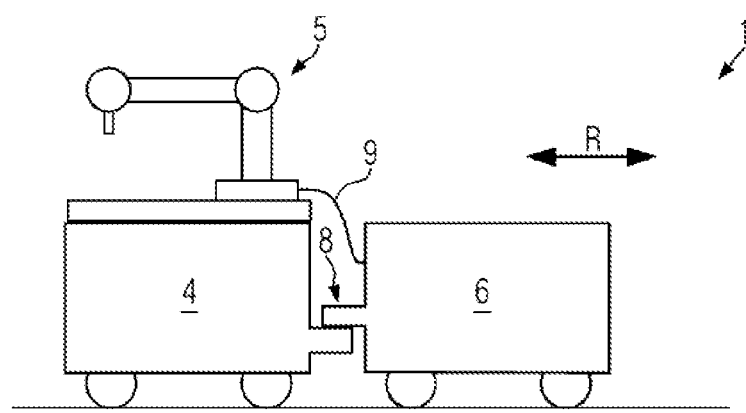
Figure 1C:
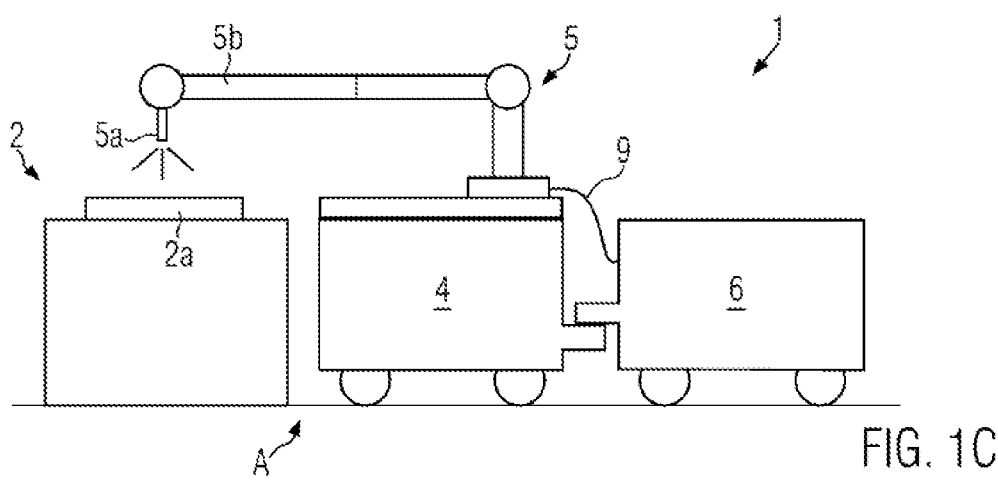

In FIGS. 1A to 1C, an exemplified embodiment of a method according to the invention for using a robot system 1 is shown in a side view. One can see the robot system 1 in FIG. 1A before the accessory trailer 6 is coupled, in FIG. 1B after the accessory trailer 6 has been coupled, and in FIG. 1C during the performance of a job.

In FIG. 1A, the robot system 1 can be seen with the chassis 3 supported on the floor at the mobile platform 4 and with the robot unit 5. The robot unit 5 comprises a robot arm 5b with at least one joint and with a tool which is embodied here, for example, as a nozzle 5a for a cleaning agent. With the robot arm 5b, the nozzle 5a can be suitably positioned or moved during cleaning. The robot unit 5 can be modular with the mobile platform 4 or firmly connected thereto. The chassis 3 supported on the floor comprises a plurality of wheels, wherein all wheels are designed to be driven and steerable. Thereby, the chassis 3 supported on the floor can be particularly well manoeuvred. However, it is also conceivable that only some of the wheels are steerable, and other wheels are driven.

Moreover, the accessory trailer 6 with the work material and/or consumable material needed for the job can be seen, which is, decoupled from the chassis 3 supported on the floor, ready to be used at a supply area V. It is also conceivable that the robot system 1 comprises a plurality of accessory trailers 6 which can be coupled to the chassis 3 supported on the floor simultaneously in series or in parallel (similar to a train).

The accessory trailer 6 comprises a supply system for cleaning agents and can be connected to the chassis 3 supported on the floor via the coupling 8. To this end, one of the coupling halves 8a, 8b is arranged at the accessory trailer and at the mobile platform 4, respectively.

To control the method, the robot system 1 comprises a controlling unit 10 arranged in the mobile platform 4 which controls both the chassis 3 supported on the floor and the robot unit 5. One can also see the superordinated controlling centre 11 which controls both the robot system 1 represented in FIGS. 1A to 1C and a plurality of other robot systems not represented here via a wireless computer network, here, for example, WLAN.

Moreover, the accessory trailer 6 comprises an RFID chip not represented here by which it can be identified by the robot system 1. It is also conceivable that the cleaning agent is identified via an RFID chip.

As can be seen in FIG. 1A, the robot system 1 removes the work material and/or consumable material by automatically coupling the accessory trailer 6 in the supply area V which here contains, for example, the supply system with cleaning agents. To this end, the chassis 3 supported on the floor is driving towards the accessory trailer 6 until the two coupling halves 8a, 8b can be connected to each other. It is conceivable that the robot arm 5b actuates the coupling 8 to do this, and thus automatically couples the accessory trailer 6.

Subsequently, and as is represented in FIG. 1B, the robot system 1 transports the work material and/or consumable material in the accessory trailer 6 in the direction R to the workstation A in FIG. 1C.

One can also see in FIG. 1B that the accessory trailer 6 is connected to the mobile platform 4 with the coupling 8. One can additionally see the supply hose 9 via which the robot unit 5 is connected to the accessory trailer 6. Thereby, the supply system in the accessory trailer 6 can convey the cleaning agent to the robot arm 5b and to the nozzle 5a arranged thereon.

In FIG. 1C one can see that the robot system 1 removes, at the workstation A, the work material and/or consumable material needed for the job, here the cleaning agent, from the accessory trailer 6 and applies it on the transporter 2a of a container handling machine 2 not shown in greater detail here, for example, to clean a conveying belt. To this end, the robot arm 5b is extended so that the nozzle 5a is arranged above the transporter 2a and the cleaning agent can thus be applied on the transporter 2a from above. To this end, the cleaning agent is pumped from the supply system in the accessory trailer 6 via the supply hose 9 to the robot arm 5b and the nozzle 5a arranged thereon.

It is conceivable that the robot system 1, after it has completed the job, subsequently drives back to the supply area V and there changes the accessory trailer 6 for another job, for example against an accessory trailer with a lubricant.

By the robot system 1 automatically removing the work material and/or consumable material needed for the job, here, for example, the cleaning agent, at the supply area V by coupling the accessory trailer 6 and transporting it to the workstation A for the job, the removal is accomplished automatically by the robot system 1 itself and without needing an operator or a complex station. Consequently, the handling of the work material and/or consumable material needed for the job is facilitated.

It will be understood that the feature mentioned with reference to the exemplified embodiment described above is not restricted to these combinations of features but are also possible individually or in any other combinations.

The invention claimed is:

1. A method for using a robot system carrying out a job at a workstation of a container processing facility, wherein the robot system moves with a chassis supported on the floor in a working area of the container processing facility,
   wherein the chassis is coupled to at least one accessory trailer, the chassis and the at least one accessory trailer having coupling halves that can be connected to one another to connect the chassis with the at least one accessory trailer, with the at least one accessory trailer being supported on the floor by a plurality of wheels such that the chassis and the at least one accessory coupling halves are maintained at a predetermined distance from the floor regardless whether the chassis and the at least one accessory trailer are coupled to one another or not coupled to one another, and
   the robot system automatically removes work material and/or consumable material needed for the job, at a supply area and transports it to the workstation for the job;
   wherein the robot system comprises a robot arm, wherein the robot arm actuates couplings of the at least one accessory trailer to automatically couple the at least one accessory trailer to the chassis.

2. The method according to claim 1, wherein the robot system transports the work material and/or consumable material to the workstation in the at least one accessory trailer, and wherein the work material and/or consumable material includes one or more of a cleaning agent and a lubricant.

3. The method according to claim 2, wherein the robot system removes the work material and/or consumable material by automatically coupling the at least one accessory trailer with the needed work material and/or consumable material at the supply area.

4. The method according to claim 2, wherein the robot system removes the work material and/or consumable material needed for the job from the at least one accessory trailer at the workstation.

5. The method according to claim 2, wherein the robot system identifies the needed work material and/or consumable material, and/or the at least one accessory trailer by means of digital identification elements.

6. The method according to claim 1, wherein for the job, the robot system is at least temporarily connected to a superordinated controlling centre via a data connection.

7. A robot system for a container processing facility, with a chassis supported on the floor for moving in a working area of the container processing facility,
   wherein
   the chassis is coupled to at least one accessory trailer, the chassis and the at least one accessory trailer having coupling halves that can be connected to one another to connect the chassis with the at least one accessory trailer, with the at least one accessory trailer being supported on the floor by a plurality of wheels such that the chassis and the at least one accessory coupling halves are maintained at a predetermined distance from the floor regardless whether the chassis and the at least one accessory trailer are coupled to one another or not coupled to one another, and
   the robot system is designed to automatically remove work material and/or consumable material needed for the job, including, a cleaning agent or a lubricant, at a supply area and transport it to the workstation for the job;

wherein the robot system comprises a robot arm, wherein the robot arm actuates couplings of the at least one accessory trailer to automatically couple the at least one accessory trailer to the chassis.

8. The robot system according to claim 7, wherein the robot system comprises the at least one accessory trailer to transport the work material and/or consumable material to the workstation.

9. The robot system according to claim 7, wherein the robot system comprises a coupling to therewith selectively connect the at least one accessory trailer with the chassis supported on the floor or release it therefrom.

* * * * *